United States Patent
Raven et al.

(10) Patent No.: US 9,541,711 B2
(45) Date of Patent: Jan. 10, 2017

(54) FIBRE OPTIC ADAPTOR AND METHOD FOR OPTICALLY CONNECTING FIBRE OPTIC DEVICES TOGETHER

(71) Applicant: FibreFab Limited, Milton Keynes, Buckinghamshire (GB)

(72) Inventors: Asher Raven, Milton Keynes (GB); Alan Keizer, Beachampton (GB)

(73) Assignee: FibreFab Limited (GB)

(*) Notice: Subject to any disclaimer, the term of this patent is extended or adjusted under 35 U.S.C. 154(b) by 70 days.

(21) Appl. No.: 14/321,151

(22) Filed: Jul. 1, 2014

(65) Prior Publication Data
US 2015/0003785 A1    Jan. 1, 2015

(30) Foreign Application Priority Data
Jul. 1, 2013    (GB) .................................. 1311768.4

(51) Int. Cl.
    G02B 6/38    (2006.01)
(52) U.S. Cl.
    CPC ........... G02B 6/3825 (2013.01); *G02B 6/3885* (2013.01); *G02B 6/3893* (2013.01)
(58) Field of Classification Search
    None
    See application file for complete search history.

(56) References Cited

U.S. PATENT DOCUMENTS

| | | | |
|---|---|---|---|
| 6,179,475 B1 | 1/2001 | Takamatsu et al. | |
| 6,224,270 B1 | 5/2001 | Nakajima et al. | |
| 6,290,527 B1 | 9/2001 | Takaya et al. | |
| 6,347,888 B1 | 2/2002 | Puetz | |
| 2002/0025121 A1* | 2/2002 | Stephenson | G02B 6/266 385/55 |
| 2008/0112672 A1* | 5/2008 | Lewallen | G02B 6/3831 385/58 |
| 2011/0081798 A1 | 4/2011 | Koreeda et al. | |

FOREIGN PATENT DOCUMENTS

| | | |
|---|---|---|
| EP | 0 819 960 A2 | 1/1998 |
| EP | 0 969 299 A2 | 1/2000 |
| WO | WO 00/31575 | 6/2000 |

OTHER PUBLICATIONS

British Search Report dated Jan. 13, 2014 for Application No. GB 1311768.4.
Extended European Search Report mailed Nov. 13, 2014 for Application No. EP 14 17 5185.

* cited by examiner

*Primary Examiner* — Hemang Sanghavi
(74) *Attorney, Agent, or Firm* — Fay Sharpe LLP

(57) ABSTRACT

An adaptor for optically connecting fiber optic devices, such as cable assemblies, together. The adaptor includes: a body (3) having first and second receiving formations (15,17), the first receiving formation (15) is arranged to receive a first fiber optic connector (19), the second receiving formation (17) is adaptable between first and second configurations, wherein in the first configuration the second receiving formation (17) is arranged to receive a second fiber optic connector (23), and in the second configuration is arranged to receive a ferrule (46).

22 Claims, 9 Drawing Sheets

FIBRE OPTIC ADAPTOR AND METHOD FOR OPTICALLY CONNECTING FIBRE OPTIC DEVICES TOGETHER

The present invention relates to an adaptor for fibre optic devices, such as fibre optic cable assemblies.

In data communications systems fibre optic cables are often connected together via adaptors. An adaptor is arranged to receive a first cable in a socket on a first side and a second cable in a socket on a second side, and to hold the first and second cables together such that their ends are substantially axially aligned thereby enabling light from a transmitter cable to be received by a receiver cable.

Adaptors can be arranged to receive cables that have similar connectors for example, it is known to provide an adaptor that can receive two standard types of connector of the same type. It is also known to provide adaptors that can receive dissimilar types of connecting arrangements, for example one known adaptor is arranged to receive a multi-fibre ferrule on one side of the adaptor and a fibre optic connector, for example of the MPO type, on the other side of the adaptor.

One problem with known types of adaptor is that different adaptors are required for each different type of connection required. Furthermore, some adaptors have unsatisfactory means of retaining one or more of the cables in the adaptor.

A further problem with known types of adaptor is that they are typically designed for use in one fibre map layout, which provides limited utility for polarity management.

Accordingly the present invention seeks to provide an adaptor for fibre optic cable assemblies that mitigates at least one of the aforementioned problems, or at least provides an alternative arrangement to known adapters, and a method for optically connecting fibre optic cable assemblies together.

According to one aspect of the invention there is provided an adaptor for optically connecting fibre optic devices, such as fibre optic cable assemblies, together, said adaptor including: a body having first and second receiving formations, the first receiving formation is arranged to receive a first fibre optic connector, and the second receiving formation is adaptable between first and second configurations. Advantageously, in the first configuration, the second receiving formation is arranged to receive a second fibre optic connector. Advantageously, in the second configuration, the receiving formation is arranged to receive a ferrule.

"Fibre optic devices" refers to any apparatus that includes at least one optical fibre. For example, "fibre optic devices" includes fibre optic cable assemblies and electronic devices having an optical fibre input and/or output connection.

By "receive" it is meant that at least a part of the connector/ferrule is connectable to the adaptor. Typically, at least a part of the connector/ferrule is inserted into the respective receiving formation, for example in the manner of a plug and socket arrangement.

The arrangement is such that, in use, a first fibre optic device, which includes the first connector is optically connectable to a second fibre optic device. The second fibre optic device includes at least one of the ferrule and the second fibre optic connector. Typically the first and second fibre optic connectors are of a standard type, according to user preference. For example, each one of the first and second fibre optic connectors can be of the MPO type. Thus the invention provides flexibility to the user to which types of fibre optic devices can be optically connected together.

Advantageously the adaptor can include a sub-adaptor for adapting the second receiving formation from one of the first and second configurations to the other of the first and second configurations. In preferred embodiments, the sub-adaptor is arranged to adapt the second receiving formation from the first configuration to the second configuration. That is, without the sub-adaptor, the second receiving formation is arranged to receive the second fibre optic connector. With the sub-adaptor, the second receiving formation is arranged to receive the ferrule.

Advantageously the sub-adaptor includes a body, and at least part of the body is substantially tubular. One of the ferrule and the second fibre optic connector is arranged to plug into the sub-adaptor body. In preferred embodiments, the ferrule is arranged to plug into the sub-adaptor body.

Advantageously the sub-adaptor can be a separate component from the adaptor body. This enables the adaptor to be used without sub-adaptor, and provides flexibility for manufacturing purposes. The sub-adaptor can be releasably attachable to the adaptor body. The adaptor can include locking means for releasably attaching the sub-adaptor to the adaptor body. For example, one of the sub-adaptor and the adaptor body includes at least one latching member and the other of the sub-adaptor and the adaptor body includes at least one latching formation, wherein the latching member is arranged to engage the latching formation in order to lock the sub-adaptor to the adaptor body. In preferred embodiments, the sub-adaptor includes first and second latching members and the adaptor body includes first and second latching formations, wherein the first and second latching members are arranged to engage with the first and second latching formations respectively. Additionally, or alternatively, the adaptor body can include first and second latching members and the sub-adaptor can include first and second latching formations, wherein the first and second latching members are arranged to engage with the first and second latching formations respectively.

Advantageously the first receiving formation includes a first opening in the body for receiving the first connector. For example, the first opening can be in the form of a first socket. The first fibre optic connector is arranged to plug into the first socket.

Advantageously the second receiving formation can include a second opening in the body. For example, the second opening can be in the form of a second socket. At least one of the second fibre optic connector, ferrule and sub-adaptor is arranged to plug into the second socket.

The first and second openings are optically connected. That is, light can travel from the first opening to the second opening, and vice versa. Typically this is achieved by the first and second openings being connected via a hole formed through the adaptor body. The adaptor body has first and second sides, the first side includes the first receiving formation and the second side includes the second receiving formation. The hole passes through the body from the first side to the second side.

In preferred embodiments, the sub-adaptor body includes a first part that is insertable into the second opening. The sub-adaptor body can include a second part that is arranged to remain outside of the second opening. This helps a user to dissemble the combined adaptor body-sub-adaptor assembly. For example, the sub-adaptor body can include a flange connected to the first part that abuts an end face of the adaptor body.

Advantageously the second receiving formation can be arranged to receive the second fibre optic connector in at least first and second orientations. That is, a user is able to insert the second fibre optic connector into the second opening in either the first or second orientations according to the user's preference. This provides a plurality of polarity options for the user, for example when connecting together multi-fibre cables, thereby allowing alternative network configurations while maintaining the correct fibre map such that transmitting fibres are optically connected with receiving fibres. This can be achieved for example by the second fibre optic connector having at least one orienting key, and the second receiving formation including first and second keyways for receiving the key(s). The first and second keyways are typically arranged substantially opposite to one another, thus providing a substantially symmetrical arrangement. This enables "key up" and "key down" connections.

Advantageously the second receiving formation can be arranged to receive the ferrule in first and second orientations. For example, the second receiving formation can be arranged such that the user is able to insert the sub-adaptor into the second receiving formation in either a first orientation or a second orientation, according to the user's preference. This provides a plurality of polarity options for the user when connecting, for example multi-fibre cables, thereby allowing alternative network configurations while maintaining the correct fibre map such that transmitting fibres are optically connected with receiver fibres. Additionally, or alternatively, the second receiving formation can be arranged such that the user is able to insert the ferrule into the sub-adaptor in either the first orientation or the second orientation according to the user's preference. This can be achieved, for example, by the ferrule having at least one orienting key, and the sub-adaptor having at least first and second keyways for receiving the key(s). The first and second keyways are typically arranged substantially opposite to one another, thus providing a substantially symmetrical arrangement. This enables "key up" and "key down" connections.

The first receiving formation can be arranged to receive the first fibre optic connector in a first orientation only. The arrangement of the first receiving formation is such that the user is constrained to insert the first fibre optic connector into the first opening in one orientation only. Thus only one of so-called "key up" and "key down" arrangements are provided. The inventors have determined that by restraining the orientation of the first fibre optic connector to a single orientation and being able to select from first and second orientations for the ferrule/second fibre optic connector, it is possible to achieve multiple standard methods for managing two fibre duplex links in a multi-fibre connection, in a simple manner.

Advantageously the first receiving formation can be arranged to receive the first fibre optic connector in first and second orientations.

Advantageously a plurality of keyways can be provided at the first end of the body, and the adapter further includes at least one blocking member for selectively blocking access to at least one of the plurality of keyways. Each keyway is arranged to receive a key, which is located on the first fibre optic connector. Typically, the first fibre optic connector includes only a single key, and therefore the keyway that receives the key depends on the orientation in which the first connector is inserted into the first opening. Thus the invention provides the user with an increased number of fibre mapping options, thereby providing the user with increased flexibility. The blocking member can be used in order to provide an initial fibre map, however if the user discovers an error, the blocking member can be removed to enable the first connector to be attached to the body in a different orientation. Thus the arrangement allows for key up and key down configurations, while providing an initial, albeit changeable, restriction to the user. The initial restriction is provided as a guide to complete the fibre map correctly.

Advantageously the blocking member can be releasably attachable to the body. For example, the blocking member can comprise an end cap that is releasably attachable to the body. Advantageously the blocking member can be releasably attachable to the body in at least first and second positions and/or first and second orientations. In said first position and/or first orientation, the blocking member can be arranged to block access to a first keyway. In said second position and/or second orientation the blocking member can be arranged to block access to a second keyway. The blocking member is arranged to allow access to the second keyway when in the first position and/or first orientation. The blocking member is arranged to allow access to the first keyway when in the second position and/or second orientation. Thus if the adaptor body includes two keyways at the first end, the blocking member is arranged to block access to only one of the first and second keyways at a time, thereby allowing access to the other keyway.

Advantageously the adaptor can include an end cap that is releasably attachable to the body in at least first and second positions and/or first and second orientations that is arranged to allow access to at least one of the plurality of keyways according to the position and/or orientation selected by the user. For example, the first member can comprise an end cap that is releasably attachable to the body in at least first and second positions and/or first and second orientations.

Advantageously at least one of the blocking member and the end cap are shaped to match a part of the shape of the first fibre optic connector. Advantageously at least one of the blocking member and the access member can include a recess arranged to seat a part of the first fibre optic connector.

The adaptor can include locking means for releasably attaching the first fibre optic connector to the adaptor. The locking means typically comprises the known locking arrangement for the connector type. The adaptor body can include at least one latching member for releasably attaching the first fibre optic connector to the adaptor.

Advantageously the adaptor can include locking means for releasably attaching the ferrule to the sub-adaptor. The locking means can include a locking member that insertable into a hole formed in one of the sub-adaptor and the adaptor body and, in use, is arranged to prevent the ferrule from exiting the second receiving formation. Advantageously the locking member can be a separate component from the adaptor body and the sub-adaptor. This enables easy removal of the ferrule from the adaptor. Preferably the locking member includes a substantially L-shaped body. One leg of the substantially L-shaped body includes a cut out section, which provides that part with a substantially forked arrangement. The other leg of the substantially L-shaped body is used to grip the locking member.

The adaptor can include locking means for releasably attaching the second fibre optic connector to the adaptor. The locking means typically comprises the known locking arrangement for the connector type. The adaptor body can include at least one latching member for releasably attaching the second fibre optic connector to the adaptor.

Advantageously the at least one latching member for releasably attaching the first fibre optic connector to the adaptor can be arranged substantially parallel with the at least one latching member for releasably attaching the second fibre optic connector to the adaptor. Advantageously one of the latching members for releasably attaching the first fibre optic connector to the adaptor can be arranged substantially co-axially with one of the latching members for releasably attaching the second fibre optic connector to the adaptor. In preferred embodiments, the adaptor body includes two latching members for releasably attaching the first fibre optic connector to the adaptor, two latching members for releasably attaching the second fibre optic connector to the adaptor, and each latching member for releasably attaching the first connector to the adaptor is arranged substantially co-axially with one of the latching members for releasably attaching the second connector to the adaptor.

Advantageously the at least one latching member that is arranged to releasably attach the sub-adaptor to the adaptor body is arranged to engage its latching formation(s) in a plane that is substantially perpendicular to a plane in which the at least one latch member for releasably attaching the second fibre optic connector to the adaptor engages its latching formation(s) on the connector. This provides a very compact arrangement. In preferred embodiments, the sub-adaptor includes two latching members for engaging respective latching formations on the adaptor body in a first plane, and the adaptor body includes two latching members for engaging latching formations on the second connector in a second plane, wherein the first plane is substantially perpendicular to the second plane.

According to another aspect of the invention there is provided a combination of an adaptor according to any one of the preceding claims, a first fibre optic device, such as a first fibre optic cable, assembly having a first fibre optic connector, and a second fibre optic device, such as a second fibre optic cable assembly, having one of a ferrule and a second fibre optic connector.

According to another aspect of the invention there is provided a method of optically connecting first and second fibre optic devices together, including providing a first fibre optic device having a first fibre optic connector located at a first end, a second fibre optic device including one of a ferrule and a second fibre optic connector located at a first end, and an adaptor according to any configuration described herein, said method including inserting the first fibre optic connector into the first receiving formation, and inserting one of the ferrule and the second fibre optic connector into the second receiving formation.

The method can include adapting the second receiving formation from one of the first and second configurations to the other of the first and second configurations using a sub-adaptor.

The method can include inserting one of the ferrule and the second fibre optic connector into the second opening via the sub-adaptor.

The method can include blocking access to one of first and second keyways formed in the first end of the adaptor body using a blocking member.

The method can include blocking the keyway by releasably attaching the blocking member to the adaptor body.

The method can include providing access to the blocked keyway by moving the blocking member from a blocking position and/or orientation to a non-blocking position and/or orientation.

According to one aspect of the invention there is provided an adaptor for optically connecting fibre optic devices together, said adaptor including: a body having first and second receiving formations, the first receiving formation is arranged to receive a first fibre optic connector, and the second receiving formation is adaptable between first and second configurations. Advantageously, in the first configuration, the second receiving formation is arranged to receive a second fibre optic connector. Advantageously, in the second configuration, the second receiving formation is arranged to receive a third fibre optic connector, wherein the second and third fibre optic connectors are dissimilar.

An embodiment of the present invention will now be described, by way of example only, with reference to the accompanying drawings in which.

Figure 1:
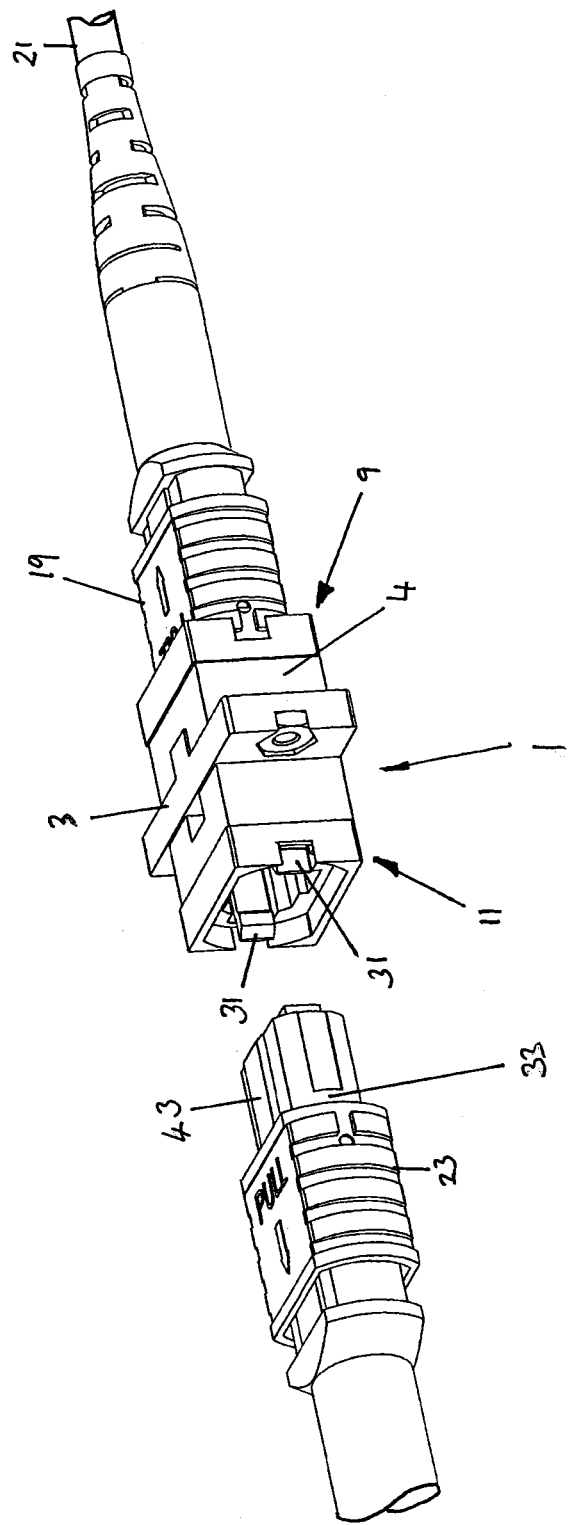
FIG. 1 is an isometric view of a first embodiment of the invention in a first configuration.
Figure 2:
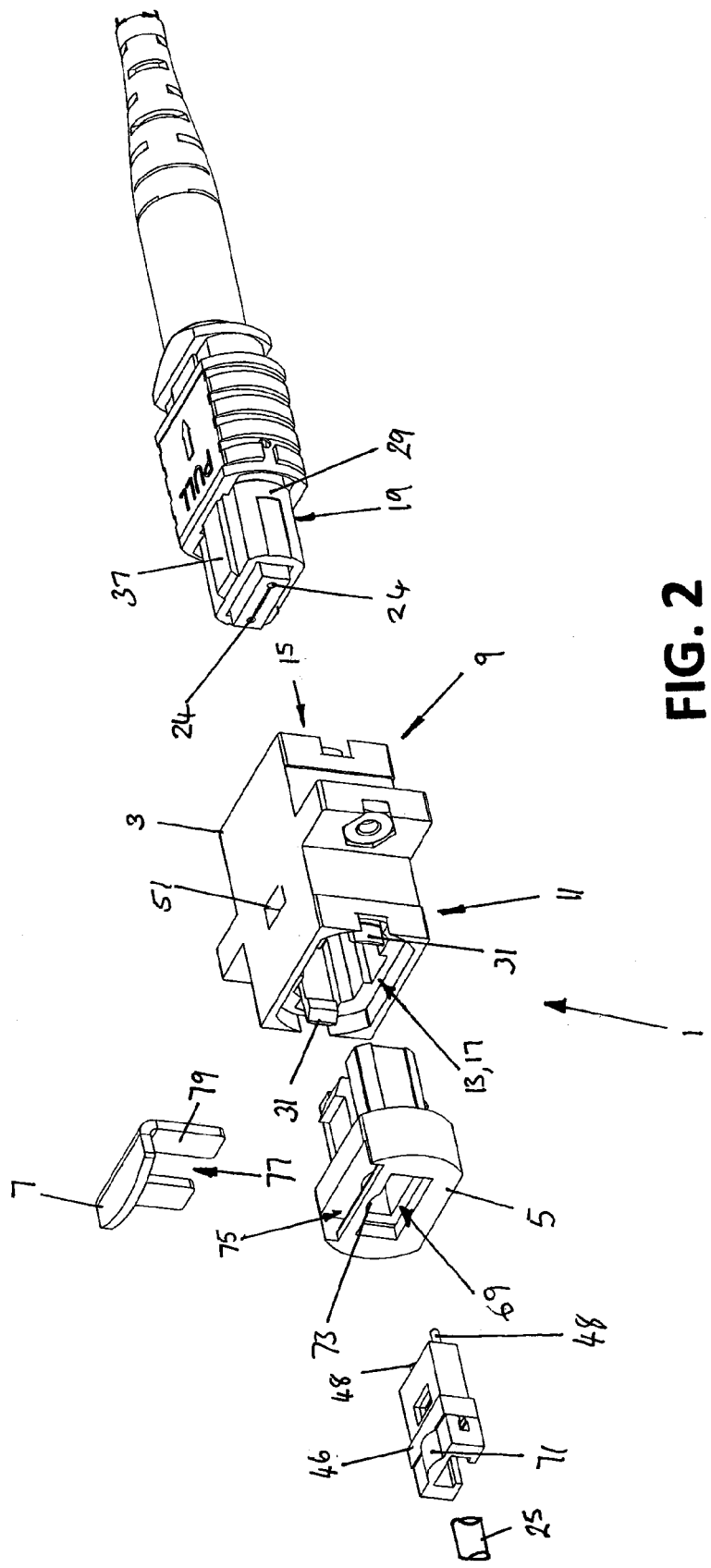
FIG. 2 is an isometric exploded view of the first embodiment in a second configuration.
Figure 3:
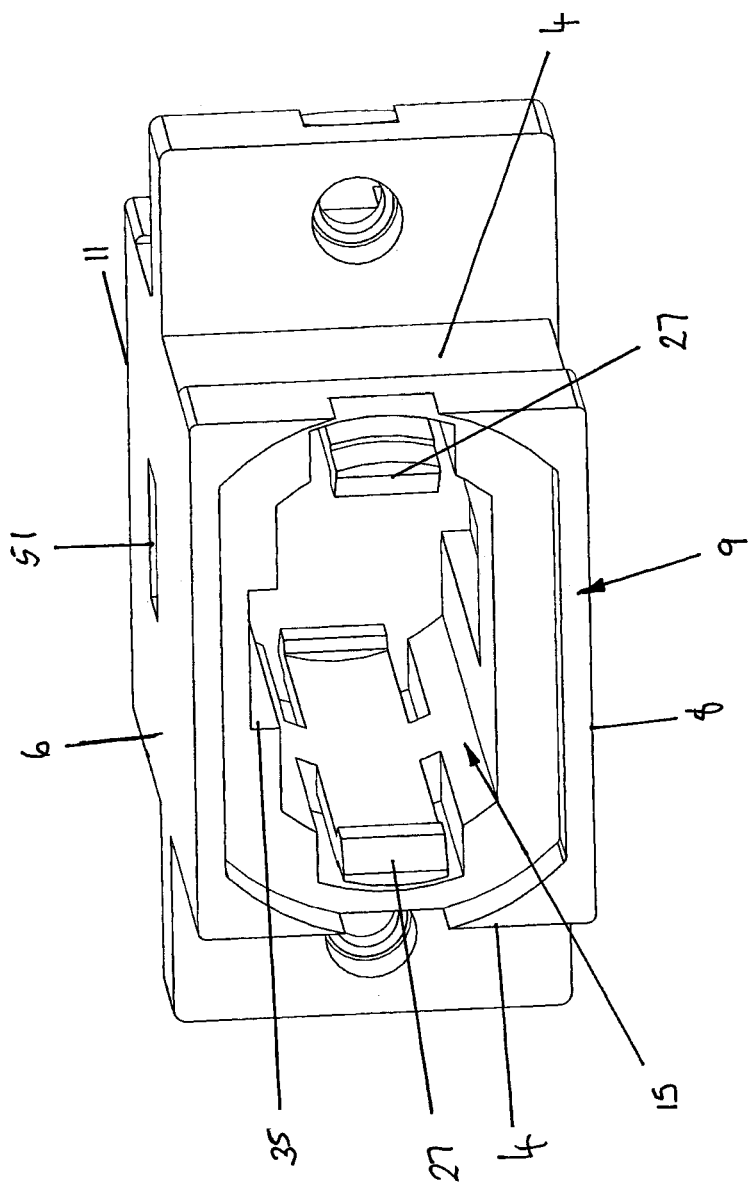
FIG. 3 is an enlarged isometric view of an adaptor body, which is included in the first embodiment, from a first side.
Figure 4:
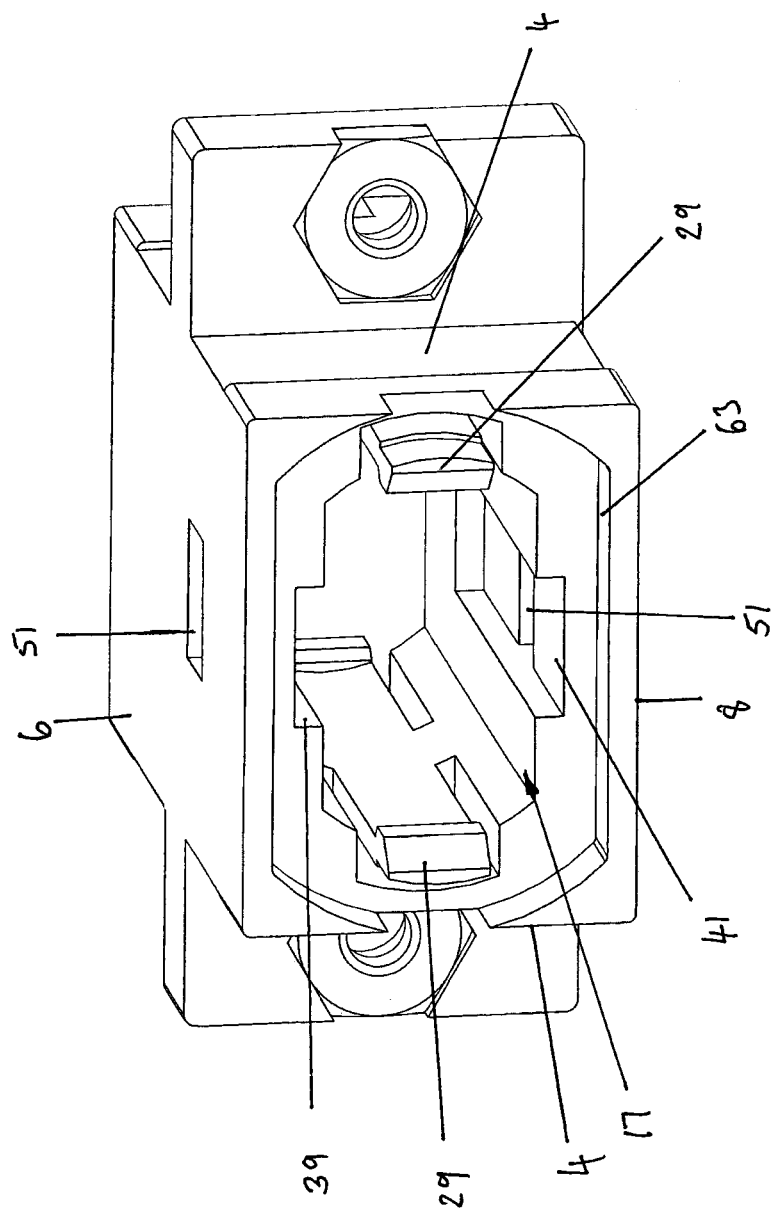
FIG. 4 is an enlarged isometric view of the adaptor body from a second side.
Figure 5:
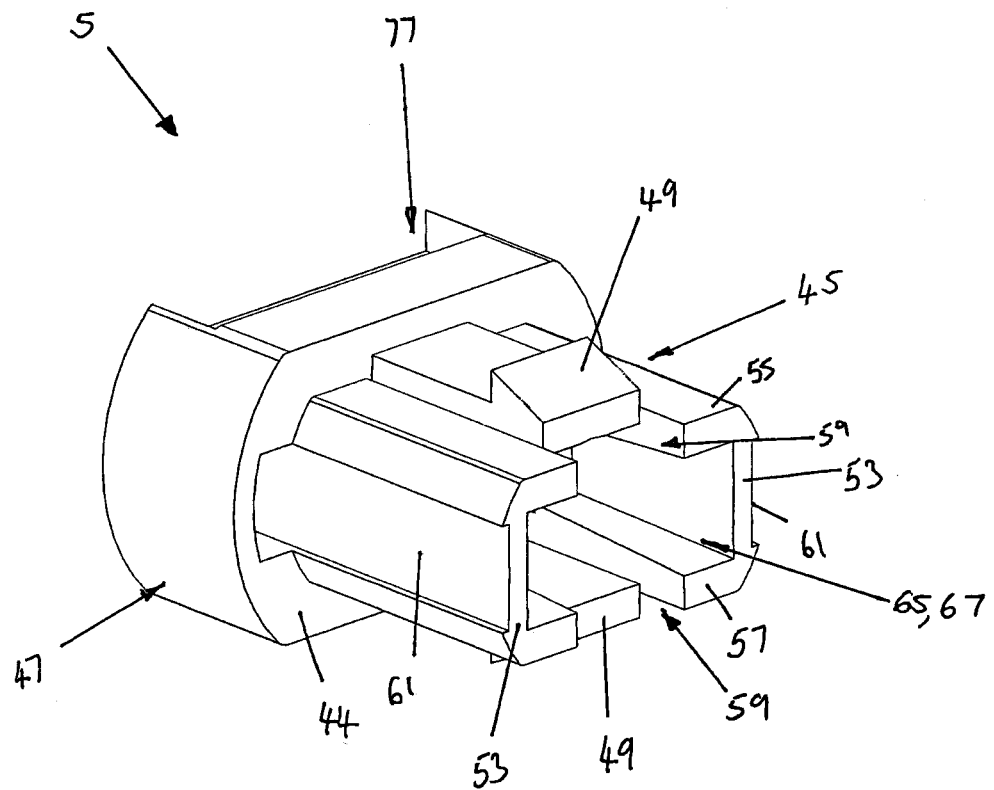
FIG. 5 is an enlarged isometric view of a sub-adaptor body, which is included in the first embodiment.

FIGS. 1 and 2 show isometric views of a fibre optic adaptor assembly 1 according to a first embodiment of the invention in first and second configurations, respectively. The fibre optic adaptor assembly 1 includes an adaptor body 3, a sub-adaptor 5, and a locking member 7.

The adaptor body 3 is a moulded component, and is typically made from a plastics material. It includes first and second ends 9,11. The body 3 includes a through hole 13, which extends through the body 3 from a first opening 15 in the first end 9 to a second opening 17 in the second end 11. The through hole 13 defines an axis along which fibre optic connectors are received and their fibre optic cables are optically connected together.

The first opening 15 is sized and shaped to receive a first fibre optic connector 19, which may be for example of the MPO type, thereby providing a first socket for receiving the first connector. The first fibre optic connector 19 is connected to one end of a first multi-fibre optical cable 21. The first fibre optic connector 19 is locked to the body 3 by way of two resilient first latches 27. Each first latch 27 engages with a latching formation 29 on the first fibre optic connector 19. Each first latch 27 is attached to a side wall 4 of the body 3. The first latches 27 are located substantially opposite to one another.

The second opening 17 is sized and shaped to receive a second fibre optic connector 23, which may be for example of the MPO type, thereby providing a second socket for receiving the second fibre optic connector 23 (see FIG. 1). The second fibre optic connector 23 is connected to one end of a second multi-fibre optical cable 25. The second fibre optic connector 23 is locked to the body 3 by way of two resilient second latches 31. Each second latch 31 engages with a latching formation 33 on the second fibre optic connector 23. Each second latch 31 is attached to one of the side walls 4 of the body 3. The second latches 31 are located substantially opposite to one another. The second latches 31 and are arranged substantially parallel with first latches 27.

The first and second fibre optic connectors 19,23 are preferably similar in type, however they may be dissimilar in type when the dissimilar types are at least partially optically alignable.

When the first and second fibre optic connectors 19,23 are inserted into their respective openings 15,17 the first and second fibre cables 21,25 are optically connected together. The end faces of the first and second fibre optic connectors 19,23 are aligned so that light transmitted from a transmitting fibre can be received by a receiving fibre. This is typically achieved by one of the first and second connectors 19,23 having a pair of alignment pins (not shown) and the other of the first and second connectors 19,23 having a pair of alignment holes 24 (shown on the first connector 19 in FIG. 2), which are arranged to receive the pins.

The body 3 includes a first keyway 35 accessible via the first end 9, which is arranged to receive a first key 37 located on the first connector 19, when the first connector 19 is inserted into the first opening 15. The first keyway 35 is located in an upper wall 6 of the body 3. The first keyway 35 is arranged substantially parallel with the axis of the through hole 13. The interaction of the first keyway 35 and first key 37 is such that the first fibre optic connector 19 can only be inserted into the first opening 15 in one orientation.

The body 3 includes second and third keyways 39,41 accessible via the second end 11, which are arranged to receive a second key 43 located on the second connector 23, when the second connector 23 is inserted into the second opening 17. The second and third keyways 39,41 are arranged substantially parallel with the axis of the through hole 13, and arranged substantially opposite to one another. The second keyway 39 is located in the upper wall 6. The third keyway 41 is located in a base wall 8. Having two keyways 39,41 at the second end 11 enables the second fibre optic connector 23 to be inserted into the second opening 17 in a first orientation or a second orientation, according to the fibre map that the user wants to create.

Restraining the orientation of the first fibre optic connector 19 and having a plurality of insertion orientations for the second fibre optic connector 23 enables "key up" and "key down" connections to be made, which enables the polarity of the cables 21,25 to be managed in a flexible, yet simple, manner.

The second opening 17 is also arranged to receive the sub-adaptor 5. When the sub-adaptor 5 is located in the second opening 17, the sub-adaptor 5 converts the second opening 17 from a first configuration in which it is arranged to receive the second fibre optic connector 23 (see FIG. 1) to a second configuration, wherein it is arranged to receive a ferrule 46 (see FIG. 2).

The sub-adaptor 5 includes a first part 45 that is inserted into the second opening 17 and a second part 47 that protrudes out of the opening 17. The first part 45 includes two resilient third latches 49. One of the resilient third latches 49 is arrange to engage with a recess/hole 51 formed in the upper wall 6. The other resilient third latch 49 is arranged to engage a recess/hole 51 formed in the base wall 8. The recesses/holes 51 are positioned on the second and third keyways 39,41, which are accessible via the second end 11, and are preferably formed through the upper and base walls 6,8, respectively. The third latches 49 releasably attach the sub-adaptor 5 to the adaptor body 3 by releasably engaging with the recesses/holes 51.

The arrangement of the third latches 49 and recesses/holes 51 is such that the sub-adaptor 5 can be attached to the body 3 in first and second orientations. The second orientation is achievable by rotating the sub-adaptor through 180 degrees about a longitudinal axis of the sub-adaptor.

When located in-situ the third latches 49 are arranged substantially parallel with the second latches 31. The third latches 49 are arranged to engage latching formations 51 in a plane that is substantially perpendicular to the plane in which the second latches 31 engage their respective latching formations 33. This provides a very compact arrangement.

The first part 45 includes side, upper and base walls 53,55,57 that are arranged to accommodate and support the ferrule 46. The upper and base walls 55,57 have longitudinal slots 59 formed therein to accommodate the third latches 49. The third latches 49 are partially located out of the plane of the upper and base walls 6,8 to enable them to flex when the ferrule 46 is located within the sub-adaptor 5.

Each side wall 53 has a longitudinal recess 61 formed in its outer surface to accommodate one of the second latches 31.

The second part 47 comprises a flanged portion, with respect to the first part 45. The end face of the second end 11 of the adaptor body includes a recess 63 that is arranged to receive an end face of the flanged portion. The flanged portion is preferably shaped similarly to the second connector 23, and therefore the recess 63 is arranged to receive both the second connector 23 and the flanged portion of the sub-adaptor 5, according to which is inserted into the adaptor body by the user.

The sub-adaptor 5 includes a through hole 65 that extends through the first and second parts 45,47 thereof, and which provides first and second openings 67,69. The second opening 69 is arranged to receive the ferrule 46, and thus provides a socket for the ferrule 46. The ferrule 46 includes a key 71 and the sub-adaptor 5 includes a single fourth keyway 73, thus ferrule 46 can be inserted into the sub-adaptor 5 in a first orientation only. However, since the sub-adaptor 5 can be inserted into the body 3 in first and second orientations, the polarity of the ferrule 46 with respect to the first fibre optic connector 19 can be changed according to user preference.

Restraining the orientation of the first fibre optic connector 19 and having a plurality of insertion orientations for the sub-adaptor 5 (and hence ferrule 46) enables "key up" and "key down" connections to be made, which enables the polarity of the cables 21,25 to be managed in a flexible, yet simple, manner.

The sub-adaptor includes a slot 75 formed in the second part that is arranged to receive the locking member 7. When located in the slot 75, the locking member holds the ferrule 46 in the sub-adaptor 5. The locking member 7 is substantially L-shaped and includes a slot 77 formed in one leg 79 to enable the fibre optic cable 25 to protrude out of the adaptor. The locking member 7 effectively narrows the second opening 69 to prevent the ferrule 46 from disassociating itself from the adaptor.

The axis of the slot 77 is arranged substantially perpendicularly to the axis of the through hole 65.

In order for a user to optically connect a first fibre optic cable assembly with a second fibre optic cable assembly, a user plugs the first fibre optic connector 19 into the first opening 15. The first key 37 is located in the first keyway 35 and the first latches 27 engage the first connector 19 thereby releasably attaching the first fibre optic connector 19 to the adaptor body 3.

If the second fibre optic cable assembly includes a second fibre optic connector 23, then the second fibre optic connector is inserted into second opening 17. The second fibre optic connector can be oriented with respect to the adaptor body 3 such that the second key 43 is located in the second keyway 39. Alternatively, the second fibre optic connector 23 can be oriented with respect to the adaptor body 3 such that the second key 43 is located in the third keyway 41. The Latches 29 engage the second connector 23 thereby releasably attaching the second fibre optic connector 23 to the adaptor body 3.

When the first and second fibre optic connectors 19,23 are located within the through hole 13, their end faces abut, and their optical fibres are optically aligned. This is typically achieved by one of the ferrule 46 and the first connector 19 having a pair of alignment pins 48 (shown on ferrule 46 in FIG. 2) and the other of the ferrule and first connector 46,19 having a pair of alignment holes 24 (shown on the first connector 19 in FIG. 2), which are arranged to receive the pins 48.

Figure 6:
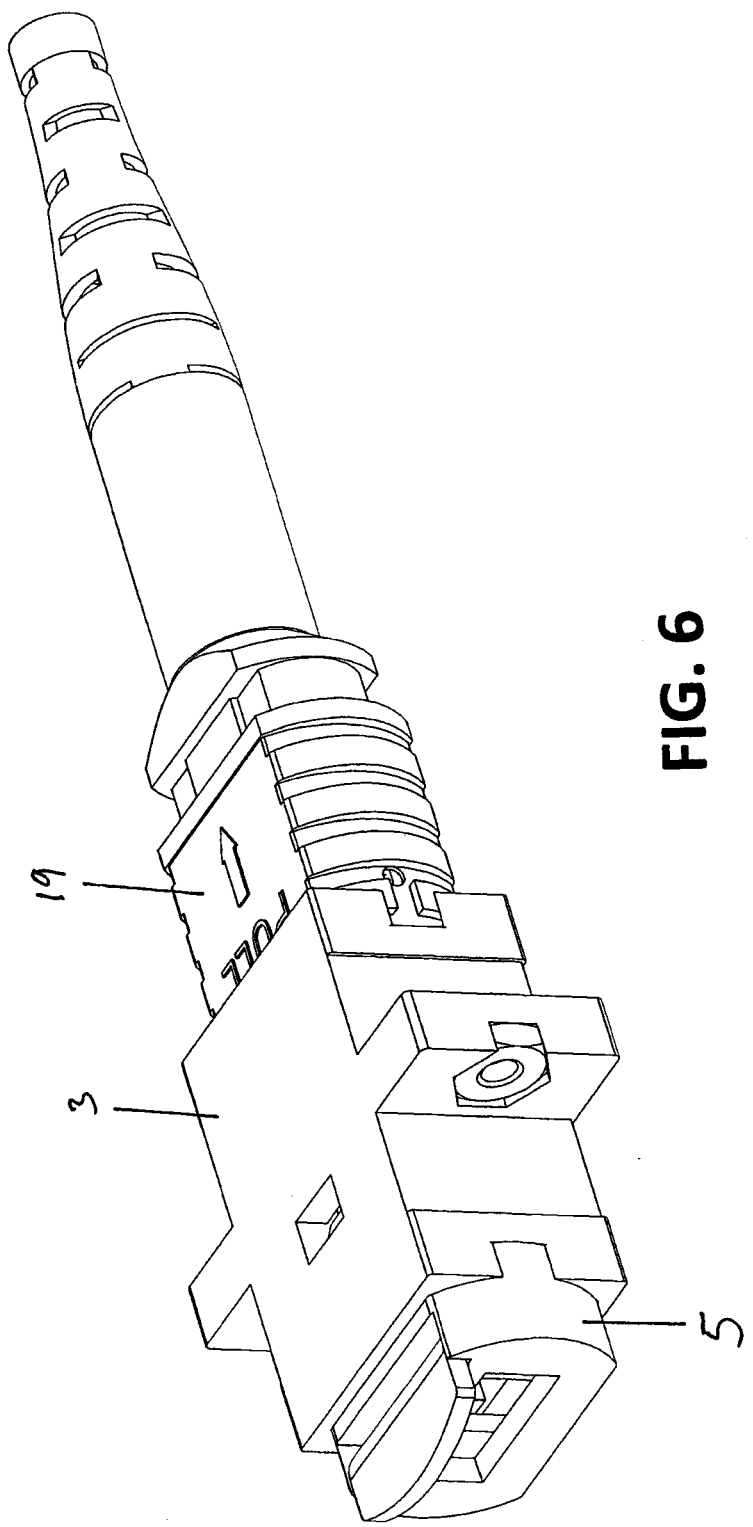
FIG. 6 is an isometric view of the first embodiment with the ferrule and the first MPO connector inserted into the adaptor body.

If the second fibre optic cable assembly includes a ferrule 46 instead of the second fibre optic connector 23, the user inserts the sub-adaptor 5 into the second opening 17 (see FIG. 6). The effect of this is to reduce the size of the second opening 17 from a size that is arranged to receive the second connector 23 to a size that is suitable to receive the ferrule 46. The user has a choice of two orientations: a first orientation with the fourth keyway 73 up, and a second orientation with fourth keyway 73 down. Upon insertion, in either orientation, the third latches 49 engage with recesses/holes 51, thereby releasably attaching the sub-adaptor 5 to the adaptor body 3. The ferrule 46 is then inserted into the second opening 69, which is effectively a modified second opening 17 of the adaptor body 3. The key 71 is located in the fourth keyway 73. After the ferrule 46 has been inserted, the user then inserts locking member 7 into the slot 77 to releasably attach the ferrule 46 to the adaptor.

Figure 7:
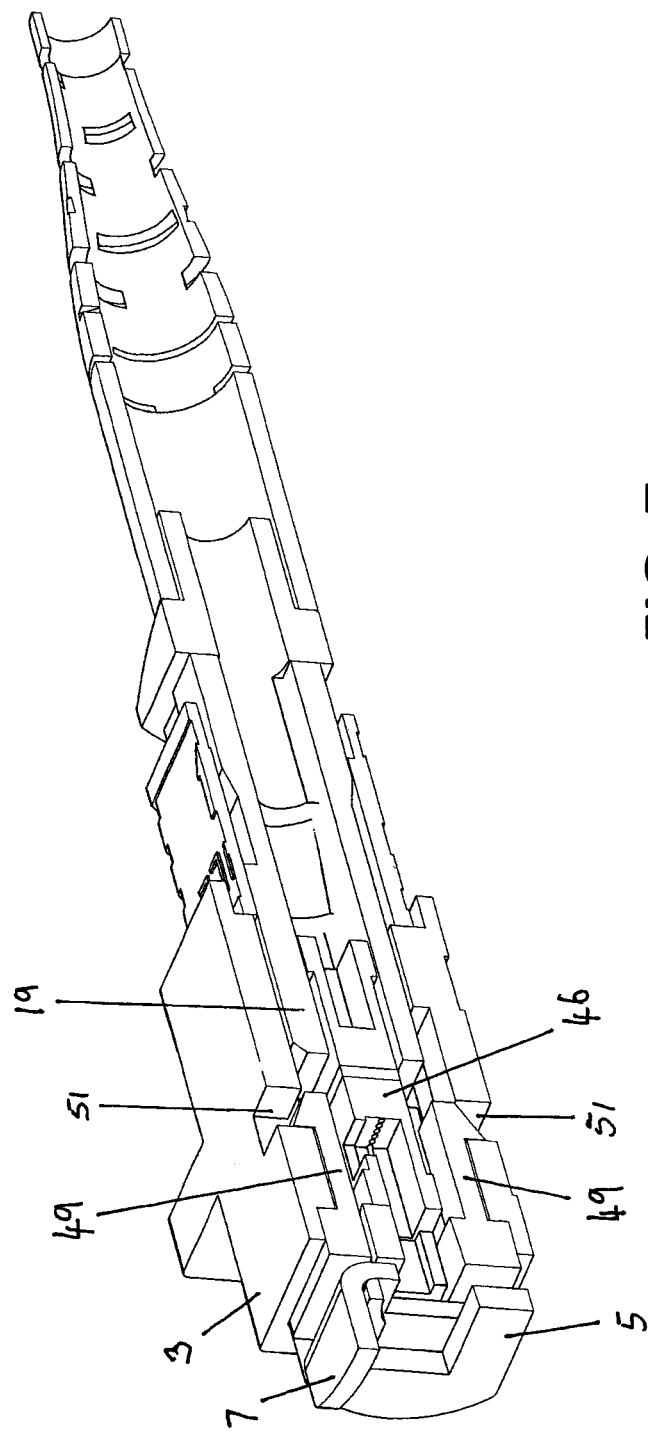
FIG. 7 is a cross-sectional view of FIG. 6.

When the first fibre optic connector 19 and ferrule 46 are located within the through hole 13, their end faces abut, and their optical fibres are optically aligned. This is illustrated in FIG. 7, which shows a partial cross-section (fibre optic cables omitted for clarity) of the device along a longitudinal axis.

Figure 8:
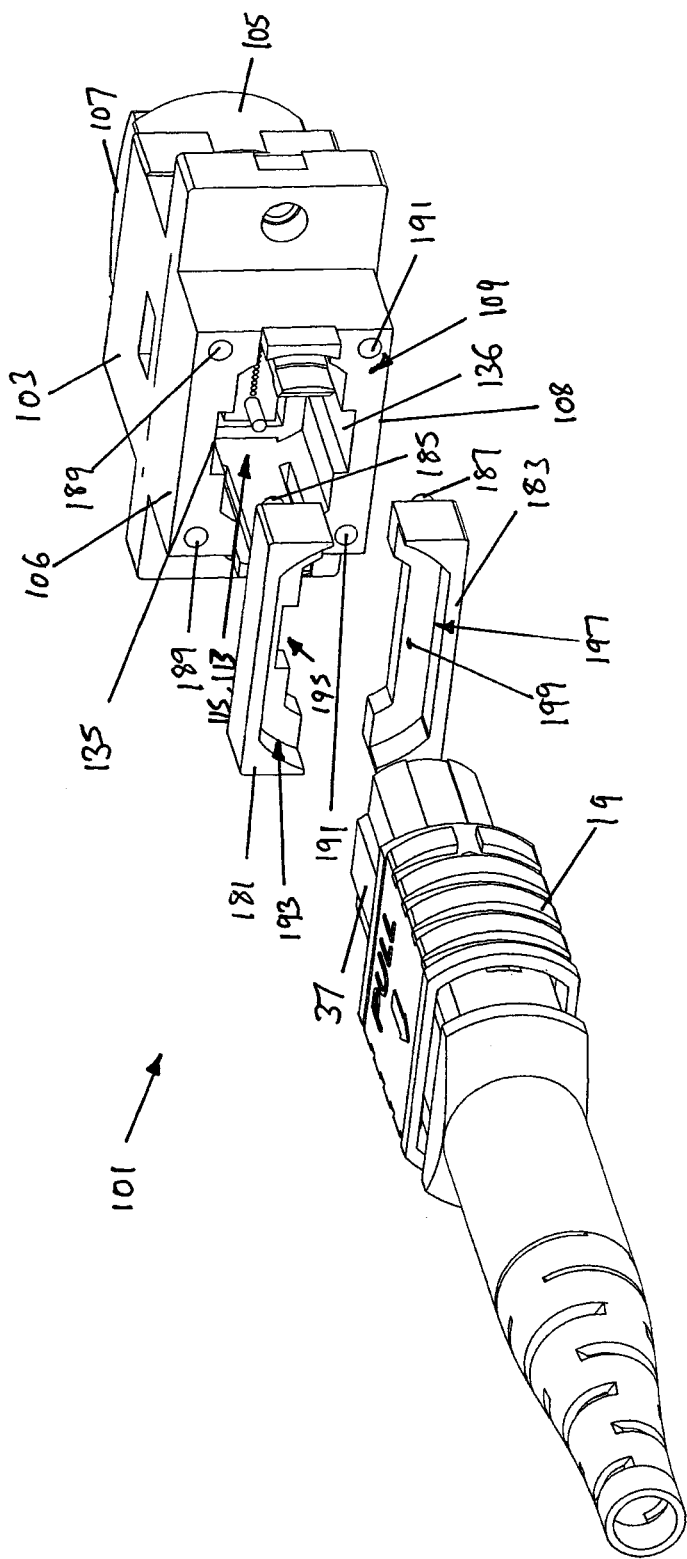
FIG. 8 is an exploded isometric view of part of a second embodiment of the invention.

FIG. 8 is an exploded view of part of a fibre optic adaptor assembly 101 according to a second embodiment of the invention. The fibre optic adaptor assembly 101 includes an adaptor body 103, a sub-adaptor 105, and a locking member 107.

The second embodiment is similar to the first embodiment, except in the following respects.

The body 103 includes a first keyway 135 and an additional keyway at the first end 109 of the adaptor body 103. Each keyway 135,136 is arranged to receive a first key 37 located on the first connector 19, when the first connector 19 is inserted into the first opening 115. The first keyway 135 is located in the upper wall 106 of the body 103. The first keyway 135 is arranged substantially parallel with the axis of the through hole 113. The additional keyway 136 is arranged substantially opposite to the first keyway 135, and is formed in the base wall 108. The additional keyway 136 135 is arranged substantially parallel with the axis of the through hole 113. Having two keyways 135,136 at the first end 109 enables the first fibre optic connector 19 to be inserted into the first opening 115 in a first orientation or a second orientation, according to the fibre map that the user wants to create.

Figure 9:
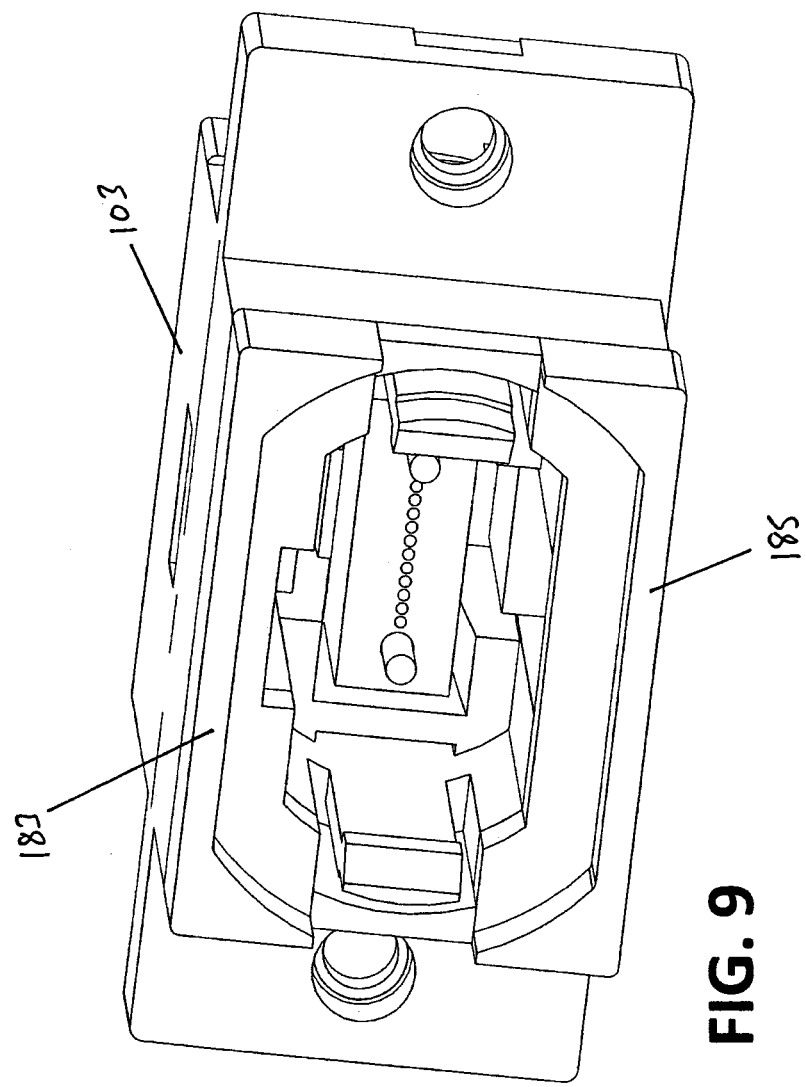
FIG. 9 is an isometric view of an adaptor included in the second embodiment, showing first and second end caps in-situ.

The second embodiment further includes first and second end caps 181,183, which are releasably attachable to the first end 109 of the adaptor body, and which are used to control access to the first keyway 135 and additional keyway 136. The first end cap 181 includes a first pair of locating pins 185, and the second end cap 183 includes a second pair of locating pins 187. The body 103 includes upper and lower pairs of locating holes 189,191. The first end cap 181 can be attached to the body 103 by inserting the first pair of locating pins 185 into either of the upper and lower pairs of locating holes 189,191 (see FIG. 9). The second end cap 183 can be attached to the body 103 by inserting the second pair of locating pins 187 into either of the upper and lower pairs of locating holes 189,191. Thus the first and second end caps 181,183 can be attached to either an upper or a lower part of the first end 109 of the body interchangeably with one another. It will be apparent to the skilled person that both of the first and second end caps 181,183 can be attached to the first end 109 of the body, just one of the end caps 181,183 can be attached, or neither of the end caps 181,183 can be attached, according to user preference.

The first end cap 181 includes a first recessed portion 193 that is arranged to match a part of the profile of the first fibre optic connector 19. The first end cap 181 further includes a slot 195 formed such that, when the first end cap 181 is attached to the adaptor body 103, the slot 195 aligns with the first keyway 135 when in the upper position, and aligns with the additional keyway 136 when in the lower position. When the slot 195 is aligned with the first keyway 135, the first fibre optic connector 19 can be inserted into the first opening 115 in an orientation wherein the first keyway 135 receives the first key 37. When the slot 195 is aligned with the additional keyway 136, the first fibre optic connector 19 can be inserted into the first opening 115 in an orientation wherein the additional keyway 136 receives the first key 37.

The second end cap 183 includes a second recessed portion 197 that is arranged to match a part of the profile of the first fibre optic connector 19. The second end cap 183 further includes a wall 199 that is arranged to block access to its associated keyway 135,136. Thus when the second end cap 183 is attached to an upper part of the first end 109, the second end cap 183 blocks access to the first keyway 135, thereby preventing the first fibre optic connector 19 from being inserted into the first opening 115 in an orientation wherein the first key 37 is received by the first keyway 135. When the second end cap 183 is attached to a lower part of the first end 109, the second end cap blocks access to the additional keyway 136, thereby preventing the first fibre optic connector 19 from being inserted into the first opening 115 in an orientation wherein the first key 37 is received by the additional keyway 136.

Thus the user is able to control the orientation in which the first connector 19 is inserted into the adaptor by appropriate use of the end caps. This enables the user to better control the fibre map. Also, if the user finds that a mistake has been made with the fibre map, the user is able to simply remove one or more of the end caps, replace them as required, and then insert the connector 19 in the correct orientation.

It is envisaged by the inventors, that the end caps 181,183 will be colour coded in order to assist the user to implement the desired fibre map.

It will be apparent to the skilled person that modifications can be made to the above embodiment that fall within the scope of the invention, for example a different type of fibre optic connector can be used for the first fibre optic connector. A different type of fibre optic connector can be used for the second fibre optic connector.

The ferrule key and keyway feature can be omitted. In this arrangement, the sub-adaptor can be inserted into the adaptor body in one orientation and the ferrule can be inserted into the sub-adaptor body in the orientation required by the user.

In the embodiment disclosed, the second fibre optic connector 23 is physically larger than the ferrule 46. In embodiments wherein the second fibre optic connector is smaller than the ferrule, it may be desirable to insert the ferrule directly into second opening 17 and to insert the second fibre optic connector into the second opening 17 via the sub-adaptor.

While the embodiments described above use the adaptor to connect fibre optic cable assemblies together, it will be appreciated that the adaptor can be used to connect together any apparatus that includes optical fibres provided that it includes the appropriate connector and/or ferrule. For example, some electronics devices include optical fibres which are used as an input and/or output connection, to enable the device to be connected with a fibre network. The optical fibres in the electronic device have ferrules or a connector attached thereto. The invention enables the electronic device to be connected to a fibre optic cable assembly or another electronic device, as required.

The invention claimed is:

1. An adaptor for optically connecting fibre optic devices together, said adaptor including: a body comprising first and second receiving formations, the first receiving formation arranged to receive a first fibre optic connector, the second receiving formation arranged to receive a second fibre optic connector; and a sub-adaptor for adapting the second receiving to receive the first fibre optic connector in first and second orientations and includes first and second keyways at a first end of the body arranged to receive a key located on the first connector, and further including at least one blocking member, wherein the blocking member is releasably attachable to the body in at least first and second positions and/or first and second orientations, wherein in said first position and/or first orientation the blocking member is arranged to block the key from accessing the first keyway and not block the key from accessing the second keyway, and in said second position and/or second orientation the blocking member is arranged to block the key from accessing the second keyway and not block the key from accessing the first keyway.

2. An adaptor according to claim 1, wherein the sub-adaptor includes a body and at least part of the body is substantially tubular.

3. An adaptor according to claim 1, wherein the ferrule is arranged to plug into the sub-adaptor body.

4. An adaptor according to claim 1, wherein the sub-adaptor is a separate component from the adaptor body, and preferably the sub-adaptor is releasably attachable to the adaptor body.

5. An adaptor according to claim 4, further including locking means for releasably attaching the sub-adaptor to the adaptor body; and/or one of the sub-adaptor and the adaptor body includes at least one latching member and the other of the sub-adaptor and the adaptor body includes at least one latching formation, wherein the latching member is arranged to releasably engage the latching formation in order to lock the sub-adaptor to the adaptor body.

6. An adaptor according to claim 1, wherein the first receiving formation includes a first opening in the body for receiving the first connector.

7. An adaptor according to claim 1, wherein the second receiving formation includes a second opening in the body for receiving the sub-adaptor.

8. An adaptor according to claim 1, wherein the second receiving formation is arranged to receive the second fibre optic connector in first and second orientations.

9. An adaptor according to claim 1, wherein the second receiving formation is arranged to receive the ferrule in first and second orientations.

10. An adaptor according to claim 1, wherein the blocking member is preferably releasably attachable to the body.

11. An adaptor according to claim 1, further including an access member that is releasably attachable to the body in at least first and second positions and/or first and second orientations, that is arranged to allow access to at least one of the plurality of keyways according to the position and/or orientation selected by the user.

12. An adaptor according to claim 1, further including locking means for locking the first fibre optic connector to the adaptor.

13. An adaptor according to claim 1, further including locking means for releasably attaching the ferrule to the adaptor; and/or locking means for releasably attaching the second fibre optic connector to the adaptor.

14. An adaptor according to claim 13, wherein the locking means includes a locking member that insertable into a hole formed in one of the sub-adaptor and the adaptor body and, in use, is arranged to prevent the ferrule from exiting the second receiving formation.

15. An adaptor according to claim 1, further including at least one latching member arranged to releasably attach the sub-adaptor to the adaptor body, and at least one latch member for releasably attaching the second fibre optic connector to the adaptor body, wherein the at least one latching member that is arranged to releasably attach the sub-adaptor to the adaptor body is arranged to engage a latching formation(s) in a first plane, the at least one latch member for releasably attaching the second fibre optic connector to the adaptor is arranged to engage a latching formation(s) on the connector in a second plane, wherein the first plane is substantially perpendicular to the second plane.

16. An adaptor according to claim 1, further comprising a first fibre optic device having a first fibre optic connector engaged with the first receiving formation, and a second fibre optic device having at least one of a ferrule and a second fibre optic connector engaged with the second receiving formation.

17. An adaptor according to claim 1, wherein the sub-adaptor is arranged for insertion into the second receiving formation in first and second orientations.

18. An adaptor according to claim 17, wherein the ferrule includes a key and the sub-adaptor includes a keyway, the arrangement being such that the ferrule can be inserted into the sub-adaptor in a first orientation only.

19. An adaptor according to claim 1, wherein the blocking member comprises an end cap.

20. An adaptor according to claim 19, wherein the end cap includes a pair of locating pins for selective insertion into first and second pairs of locating holes formed in the body.

21. A method of optically connecting first and second fibre optic devices together, including providing a first fibre optic device having a first fibre optic connector including a key, a second fibre optic device including at least one of a ferrule and a second fibre optic connector, and an adaptor, said adaptor including:
a body comprising first and second receiving formations, the first receiving formation arranged to receive a first fibre optic connector, the second receiving formation arranged to receive a second fibre optic connector; and
a sub-adaptor for adapting the second receiving formation to receive a ferrule;
wherein the first receiving formation is arranged to receive the first fibre optic connector in first and second orientations and includes first and second keyways at a first end of the body arranged to receive a key located on the first connector, said adaptor further including at least one blocking member, wherein the blocking member is releasably attachable to the body in at least first and second positions and/or first and second orientations, wherein in said first position and/or first orientation the blocking member is arranged to block the key from accessing the first keyway and not block the key from accessing the second keyway, and in said second position and/or second orientation the blocking member is arranged to block the key from accessing the second keyway and not block the key from accessing the first keyway;

adapting a second receiving formation of the adaptor with a sub-adaptor to receive the ferrule;

inserting the ferrule into the sub-adaptor;

blocking the key from accessing a first keyway formed in a first end of the adaptor, without blocking the key from accessing a second keyway formed in the first end of the adaptor, by releasably attaching a blocking member to the adaptor at a first position and/or first orientation; or blocking the key from accessing the second keyway, without blocking the key from accessing the first keyway, by releasably attaching the blocking member to the adaptor at a second position and/or second orientation; and inserting the first fibre optic connector into a first receiving formation of the adaptor, such that the key enters an accessible one of the first and second keyways.

22. An adaptor for optically connecting fibre optic devices together, said adaptor including: a body comprising first and second receiving formations, the first receiving formation arranged to receive a first fibre optic connector having a key, the second receiving formation arranged to receive a second fibre optic connector; and a sub-adaptor for adapting the second receiving formation to receive a ferrule; wherein the first receiving formation is arranged to receive the first fibre optic connector in first and second orientations and includes a plurality of keyways at a first end of the body, each arranged to receive the key according to a user selection, and further including at least one movable blocking member for selectively blocking the key from accessing at least one of the plurality of keyways.

* * * * *